United States Patent
Holmes

(10) Patent No.: US 7,479,081 B2
(45) Date of Patent: Jan. 20, 2009

(54) HYBRID ELECTRICALLY VARIABLE TRANSMISSION WITH DUAL POWER PATHS AND SELECTIVE MOTOR CONNECTION

(75) Inventor: Alan G. Holmes, Clarkston, MI (US)

(73) Assignee: GM Global Technology Operations, Detroit, MI (US)

( * ) Notice: Subject to any disclaimer, the term of this patent is extended or adjusted under 35 U.S.C. 154(b) by 272 days.

(21) Appl. No.: 11/552,663

(22) Filed: Oct. 25, 2006

(65) Prior Publication Data

US 2008/0103002 A1    May 1, 2008

(51) Int. Cl.
F16H 3/72    (2006.01)
(52) U.S. Cl. ........................................................ 475/5
(58) Field of Classification Search .................. 475/5, 475/207, 218, 219; 477/3; 180/65.2, 65.4
See application file for complete search history.

(56) References Cited

U.S. PATENT DOCUMENTS

| | | | |
|---|---|---|---|
| 5,558,595 A | 9/1996 | Schmidt et al. | |
| 5,931,757 A | 8/1999 | Schmidt | |
| 6,478,705 B1 | 11/2002 | Holmes et al. | |
| 6,527,658 B2 | 3/2003 | Holmes et al. | |
| 6,994,646 B2 * | 2/2006 | Ai | 475/5 |
| 7,086,977 B2 * | 8/2006 | Supina et al. | 475/5 |
| 7,276,008 B2 * | 10/2007 | Yasui et al. | 475/5 |
| 2002/0094898 A1* | 7/2002 | Hata et al. | 475/5 |
| 2005/0096170 A1* | 5/2005 | Holmes | 475/5 |
| 2008/0039257 A1* | 2/2008 | Holmes | 475/5 |

* cited by examiner

Primary Examiner—Roger Pang

(57) ABSTRACT

An electrically variable transmission having two motor/generators provides power-split, electrically variable power flow along dual power paths and provides multiple operating modes, including an electrically variable input-split mode. The transmission also includes a differential gear set having five gear elements. A first of the motor/generators is continuously connected to one of the gear elements and a second of the motor/generators is separately selectively connectable to two of the other gear elements. When the second motor/generator is connected to both of the gear elements, a fixed speed ratio can be established; thus, no lock-up clutch is necessary to achieve a fixed speed ratio through the differential gear set.

11 Claims, 2 Drawing Sheets

HYBRID ELECTRICALLY VARIABLE TRANSMISSION WITH DUAL POWER PATHS AND SELECTIVE MOTOR CONNECTION

TECHNICAL FIELD

The invention relates to a hybrid electrically variable transmission having two motor/generators, one of which is selectively connectable to two different gear elements of a five node compound differential gear set, and the other of which is connectable to yet a different gear element, and that provides an electrically variable input-split operating mode.

BACKGROUND OF THE INVENTION

Hybrid electrically variable powertrains include an engine and a transmission that receives power flow from the engine and from one or more motor/generators. Hybrid electrically variable transmissions have a differential gear set, with power from the engine and power from the motor/generator flowing through different members of the differential gear set. Hybrid electrically variable transmissions may include torque-transmitting mechanisms engagable according to various engagement schedules to offer a combination of operating modes, including both electrically variable ranges and fixed gear ratios. The electrically variable ranges typically provide optimum engine speed with smooth operation while the fixed gear ratios provide maximum torque performance and maximum fuel economy under certain conditions such as continuous highway cruising. The electrically variable range is established via an electromechanical power path, wherein a fraction of the power transmitted from the engine to the output is converted into electricity by a motor/generator then back into mechanical power by a motor/generator. Fixed gear ratios typically provide excellent transmission output torque and vehicle acceleration by coupling the motor/generators and the engine directly together. In a fixed gear ratio, the power flow from the transmission input member to the transmission output member is considered to be entirely through a mechanical power path, as speed is not varied by the motor/generator.

SUMMARY OF THE INVENTION

An electrically variable transmission having two motor/generators provides power-split, electrically variable power flow along dual power paths and provides multiple operating modes, including an electrically variable input-split mode. The transmission also includes a differential gear set having five gear elements (i.e., a compound differential gear set representable by a five node lever diagram). A first of the motor/generators is continuously connected to one of the gear elements and a second of the motor/generators is separately selectively connectable to two of the other gear elements. When the second motor/generator is connected to both of the gear elements, a fixed speed ratio can be established, thus, no lock-up clutch is necessary to achieve a fixed speed ratio through the differential gear set.

As used herein, a "gear element" is an element of a differential gear set that can be represented by a node on a lever diagram. For instance, in a planetary gear set, a carrier member, a sun gear member and a ring gear member are all represented as nodes on a lever diagram, but pinion gears supported by the carrier member are not represented as nodes. Also, in a compound planetary gear set, those gear elements that are continuously interconnected with one another are represented by a single node. Those skilled in the art readily understand the representation of compound differential gear sets as lever diagrams.

As used herein, a "mode" is a particular operating state, whether encompassing a continuous range of speed ratios or only a fixed speed ratio, achieved by engagement of a particular torque-transmitting mechanism or combination of torque-transmitting mechanisms.

The transmission includes an input member adapted to receive power from an engine, and an output member. The input member is connected for common rotation with the first gear element and the first motor/generator is connected for common rotation with the second gear element. The transmission further includes intermeshing gears, at least one of which is connectable for rotation with the output member. A first motor clutch selectively engages the second motor/generator with the third gear element. A second motor clutch selectively engages the second motor/generator with the fourth gear element. First and second transfer members, which are preferably shafts, are connected for common rotation with the fourth and fifth gear elements, respectively, and are separately operatively connectable with the output member via different ones of the intermeshing gears by engagement of different output torque-transmitting mechanisms. Thus, the first and second transfer members partially form first and second power paths between the input member and the output member.

Multiple operating modes are possible by engagement of different combinations of the motor clutches and the output torque-transmitting mechanisms. For example, an electrically variable input-split mode is established by engagement of the second motor clutch and one of the output torque-transmitting mechanisms that connects the fourth gear element to the output member. A compound-split operating mode is established by engagement of the first motor clutch and the same output torque-transmitting mechanism that was engaged in the electrically variable input-split operating mode. A fixed ratio mode is established if both of the motor clutches and that same output torque-transmitting mechanism are engaged, because engagement of both of the motor clutches locks up the differential gear set so that all gear elements rotate at the same speed.

In one embodiment, the intermeshing gears include multiple gear sets that transfer torque from the transfer members to the output member via a countershaft. One of the gear sets may be a reversing gear set with a gear connected for common rotation with the output member, a gear connectable for rotation with the countershaft, and a reversing or idler gear intermeshing with both of the other gears. Engagement of the second motor clutch and of a reverse output clutch connects the gear for common rotation with the output shaft to enable an input-split, electrically variable mode. If there are three other gear sets with three additional output torque-transmitting mechanisms selectively engagable to transfer torque from the countershaft alone each of these sets, respectively, then this embodiment achieves one electrically variable input-split forward mode, three electrically variable compound-split modes and five fixed forward ratio modes in addition to the electrically variable input-split reverse mode.

In another embodiment, the intermeshing gears are a single planetary gear set having a first member connected for rotation with the first transfer member, a second member connected for rotation with the output member and a third member selectively grounded to the stationary member via one of the output torque-transmitting mechanisms. The output torque-transmitting mechanisms also include a clutch that selectively connects the fifth gear element to the output member. This embodiment achieves one electrically variable input-split mode, two electrically variable input split modes and three fixed ratio modes.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment

Figure 1:
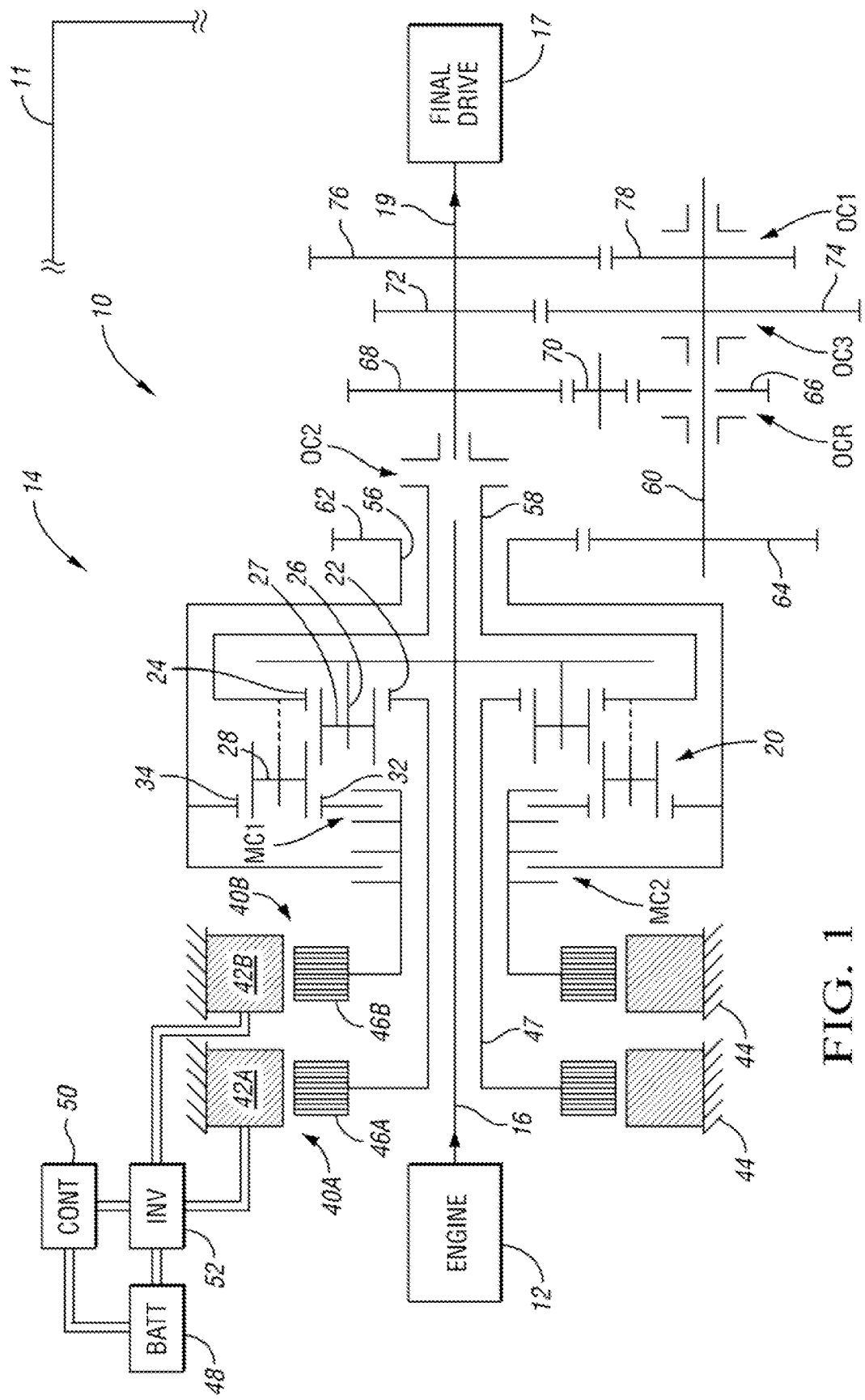
FIG. 1 is a schematic illustration of a first powertrain including a first transmission within the scope of the invention.

Referring to the drawings, wherein like reference numbers refer to like components, FIG. 1 shows a powertrain 10 for a vehicle 11 (shown schematically). The powertrain 10 includes an engine 12 connected to one embodiment of an electrically variable transmission (EVT) designated generally by the numeral 14. The transmission 14 is designed to receive at least a portion of its driving power from the engine 12. The engine 12 has an output shaft connected with an input member 16 of the transmission 14. A final drive unit 17 operatively connected to an output member 19 of the transmission 14.

The transmission 14 includes a compound differential gear set 20. The differential gear set 20 is a Ravigneaux type gear set, although other types of differential gear sets may be used within the scope of the invention. Specifically, the differential gear set 20 includes a sung gear member 22, a ring gear member 24 and a carrier member 26 that rotatably supports a first set of pinion gears 27 that intermesh with the sun gear member 22 and the ring gear member 24 and with a second set of pinion gears 28. The carrier member 26 also rotatably supports the second set of pinion gears 28 that intermesh with a sun gear member 32 and a ring gear member 34 and with the first set of pinion gears 27. Those skilled in the art will recognize that the differential gear set 20 may be represented as a five node lever diagram, each node of the lever diagram representing the following gear elements: sun gear member 22, sun gear member 32, carrier member 26, ring gear member 24 and ring gear member 34. In the claims, the carrier member 26 is referred to as the first gear element, the sun gear member 22 is referred to as the second gear element, the sun gear member 32 is referred to as the third gear element, the ring gear member 34 is referred to as the fourth gear element and the ring gear member 24 is referred to as the fifth gear element.

The input member 16 is continuously connected with the carrier member 26. A first motor/generator 40A is continuously connected to the sun gear member 22. The ring gear members 24 and 34 function as two separate output elements of the differential gear set, partially forming two separate power paths through the transmission 14, as discussed below.

The motor generator 40A includes a stator portion 42A grounded to a stationary member 44, such as the transmission housing. A rotor portion 46A of the motor/generator 40A is continuously connected to the sun gear member 22 via a sleeve shaft 47. The stator 42A may receive electrical power from or provide electrical power to an energy storage device 48 such as a battery. An electronic controller 50 is in signal communication with the battery 48 and with a power inverter 52 that is also in electrical communication with the stator portion 42A. The controller 50 responds to a variety of input signals including vehicle speed, operator demand, the level at which the battery 48 is charged and the power being provided by the engine 12 to regulate the flow of power between the motor/generator 40A and the battery 48 via the inverter 52, which converts between direct current provided or utilized by the battery 48 and alternating current provided or utilized by the stator portion 42A.

A second motor/generator 40B includes a stator portion 42B grounded to the stationary member 44. A rotor portion 46B of the motor/generator 40B is selectively connectable to the sun gear member 32 via engagement of a first motor clutch MC1. The rotor portion 46B is also selectively connectable with the ring gear member 34 via engagement of a second motor clutch MC2. The battery 48, controller 50 and inverter 52 are operatively connected with the stator portion 42B in the same manner as explained above with respect to the stator portion 42A.

The transmission 14 further includes transfer members 56, 58, countershaft 60 and a plurality of intermeshing gears selectively connecting the transfer members 56, 58 with the output member via the countershaft 60, as described below. Ring gear member 24 is continuously connected with transfer member 58. Ring gear member 34 is continuously connected with transfer member 56.

The intermeshing gears include an intermeshing gear set consisting of gear 62 and gear 64. Gear 62 is connected for common rotation with the transfer member 56 and intermeshes with gear 64, which is connected for common rotation with the countershaft 60. The intermeshing gears further include a reversing gear set consisting of intermeshing gears 66, 68 and 70. Gear 66 rotates concentrically about countershaft 60 and is selectively connectable for common rotation therewith by selective engagement of output clutch OCR. Gear 69 rotates with output member 19. Reversing gear 70 intermeshes with both gears 66 and 68 so that gears 66 and 68 rotate in the same direction. The reversing gear 70 is supported on a separate shaft or support structure (not shown) and rotates about an axis parallel to the transfer members 56, 58 and the countershaft 60. The intermeshing gears further include a gear set consisting of intermeshing gears 72 and 74. Gear 72 rotates with output member 19. Gear 74 intermeshes with gear 72 and is selectively connectable for common rotation therewith by selective engagement of output clutch OC3. The intermeshing gears further include a gear set consisting of intermeshing gears 76 and 78. Gear 76 rotates with output member 19. Gear 78 intermeshes with gear 76 and is selectively connectable for common rotation therewith by selective engagement of output clutch OC1.

In addition to the output clutches OC1, OC3 and OCR, an output clutch OC2 is selectively engagable to connect transfer member 58 and ring gear member 24 for common rotation with output member 19. Thus, the transmission 14 includes four output clutches (OC1, OC2, OC3 and OCR) and four countershaft gear sets (gear set 62, 62; gear set 68, 70, 66; gear set 72, 74; and gear set 76,78).

The torque-transmitting mechanisms MC1, MC2, OC1, OC2, OC3 and OCR are operatively connected to controller 50 (connected by transfer conductors, not shown for simplicity) that controls engagement thereof to provide multiple operating modes, including an electrically variable input-split (forward) mode, three electrically variable compound-split forward modes, an electrically-variable input-split reverse mode and five fixed forward ratios, as described below.

The transmission 14 can operate in an electrically-variable input-split mode for low output speeds by engaging motor clutch MC2 and output clutch OC1. Motor/generator 40B is connected with transfer member 56 and ring gear member 34 (by engagement of MC2), which in turn are operatively connected with the output member 19 via the gear set 62, 64 and gear set 76, 78 (by engagement of output clutch OC1). Torque is also provided by the engine 12 through the differential gear set 20 to the transfer member 56. As the speed of the output member 19 increases from zero with the speed of engine 12 constant and non-zero, that is as the transmission speed ratio falls, the speed of the ring gear member 34 increases from zero, the speed of the sun gear member 22 falls toward and then through zero, and the speed of the sun gear member 32 rises, considering positive speed to be in the same direction as positive rotation of the output member 19.

At some point during the electrically variable input-split forward mode, the motor/generator 40B can be connected to sun gear member 32 by engagement of motor clutch MC1 and disconnected from ring gear member 34 by disengagement of motor clutch MC1. With the motor/generator 40B connected to the sun gear member 32, the transmission 14 can operate in three different electrically variable compound-split (forward) modes, by engagement of the each one of output clutches OC1, OC2 and OC3, respectively. That is, a first electrically variable compound-split (forward) mode is established by engagement of MC1 and output clutch OC1, a second electrically variable compound-split (forward) mode is established by engagement of motor clutch MC1 and the output clutch OC2, and a third electrically variable compound-split (forward) mode is established by engagement of motor clutch MC1 and output clutch OC3.

In the electrically-variable input split or compound split modes, the motor/generator 40A or 40B may act as a motor to add torque to the transmission 14. If braking occurs during these modes, the motor/generator 40A or 40B is controlled as a generator to convert rotational speed of one of the sun gear members 22 or 32 (in compound-split modes), respectively, into stored electrical power in the battery 48 with the motor rotor 46A or 46B, respectively, absorbing torque as it does so to help slow the output member 19 and brake the vehicle 11. Similarly, the motor/generators 40A and 40B may be controlled to operate as generators to recharge the battery 48.

An electrically variable input-split reverse mode is established by engagement of motor clutch MC2 and output clutch OCR. Motor/generator 40B is connected with transfer member 56 and ring gear member 34 (by engagement of MC2), which in turn are operatively connected with the output member 19 via the gear set 62, 64 and reverse gear set 66, 70, 68 (by engagement of output clutch OCR). Torque is also provided by the engine 12 through the differential gear set 20 to the transfer member 56.

The transmission 14 can operate at five different fixed ratios. For example, in the shift from the electrically variable input-split mode in which motor clutch MC2 and output clutch OC1 are engaged to the electrically variable compound-split mode in which motor clutch MC1 and output clutch OC1 are engaged, both described above, if both motor clutches MC1 and MC2 are engaged while output clutch OC1 is engaged, a fixed gear ratio will be achieved, as the differential gear set 20 will be locked with all components rotating at one speed. Thus, the motor clutches MC1 and MC2 can be operated to take the place of a separate lockup clutch for the planetary gear set 20. A second fixed ratio is achieved with both motor clutches MC1 and MC2 engaged and output clutch OC2 engaged. A third fixed ratio is achieved with both motor clutches MC1 and MC2 engaged and output clutch OC3 engaged. A fourth fixed ratio is achieved during compound split operation with motor clutch MC1 engaged by engaging two output clutches OC1 and OC2 as these will cause the different transfer members 56 and 58, and thus the ring gear elements 24 and 34 to rotate at the same speed. Similarly, a fifth fixed ratio is achieved by engaging output clutches OC2 and OC3 while motor clutch MC1 is engaged.

The powertrain 10 provides several electric-only operating modes wherein power is provided only by the motor/generators 40A, 40B, such as key-on engine starting, engine-off reverse driving, and engine-off forward driving. A key-on engine starting and idle operating mode is achieved by engaging both of the motor clutches MC1 and MC2. Electrical energy is supplied from the battery 48 to the motor/generators 40A and 40B, which act as motors to turn both of the sun gear member 22, 32 in the same direction. The transfer members 56 and 58 rotate relatively freely, as none of the output clutches OC1, OC2, OC3 and OCR are engaged, so the output member 19 does not rotate. The pinions gears 27, 28 rotate due to the sun gear members 22, 32, and cause the carrier member 26, and thus the input member 16, to rotate. This in turn causes rotation of the engine output member (connected to the transmission input member 16), turning the engine over to start the engine 12.

A fixed reverse speed ratio is achieved by engaging both motor clutches MC1, MC2 and output clutch OCR. In this arrangement, all members of the planetary gear set 20 as well as the input member 16 and the motor/generator 40A and 40B rotate at the same speed. Torque is transferred to the output member 19 via gear set 62, 62, the reverse gear set (gear 66, reversing gear 70 and gear 68), and countershaft 60.

An electric-only reverse mode is achieved, for example, by engaging only output clutch OCR while the motor/generator 40A supplies mechanical power to the sun gear member 22. Pinion gears 27, 28, respectively, supply mechanical power to the ring gear members 24 and 34. Ring gear member 34 provides rotational speed to the countershaft 60 and the reverse gear set (gear 66, reversing gear 70 and gear 68). The reversing gear 70 reverses the direction of rotation so that gear 68 rotates at the same speed and in the same direction as gear 66.

First and second power paths (ring gear member 34 and transfer member 56 being the first power path, ring gear member 24 and transfer member 58 being the second power path) are provided in the transmission 14. The second power path is used when output clutch OC2 is engaged. The first power path is used when any of clutches OCR, OC1 or OC3 are engaged.

Second Embodiment

Figure 2:
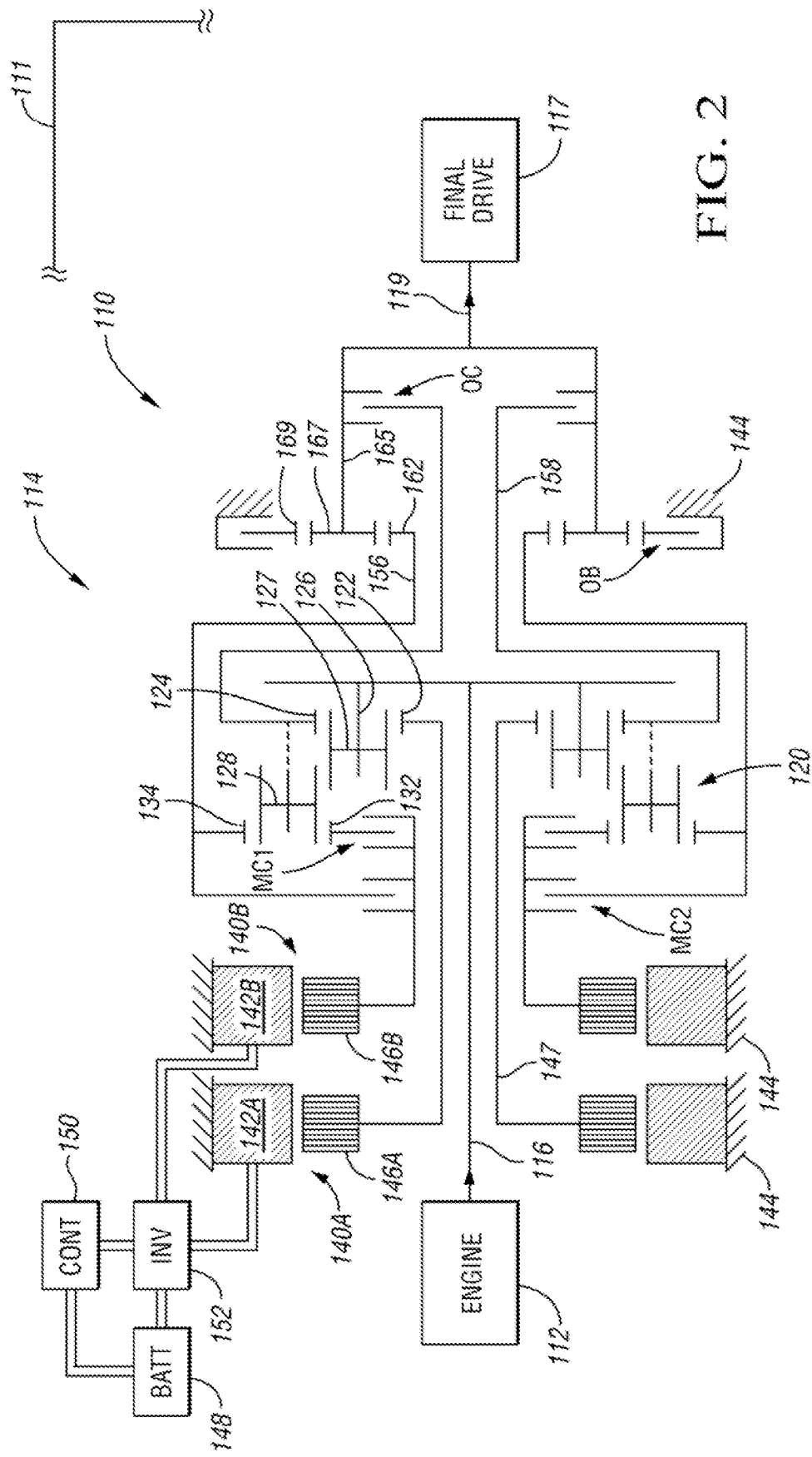
FIG. 2 is a schematic illustration of a second powertrain including a second transmission within the scope of the invention.

Referring to the drawings, wherein like reference numbers refer to like components, FIG. 2 shows a powertrain 110 for a vehicle 111 (shown schematically). The powertrain 110 includes an engine 112 connected to one embodiment of an electrically variable transmission (EVT) designated generally by the numeral 114. The transmission 114 is designed to receive at least a portion of its driving power from the engine 112. The engine 112 has an output shaft connected with an input member 116 of the transmission 114. A final drive unit 117 is operatively connected to an output member 119 of the transmission 114.

The transmission 114 includes a compound differential gear set 120. The differential gear set 120 is a Ravigneaux type gear set, although other types of differential gear sets may be used within the scope of the invention. Specifically, the differential gear set 120 includes a sung gear member 122, a ring gear member 124 and a carrier member 126 that rotatably supports a first set of pinion gears 127 that intermesh with the sun gear member 122 and the ring gear member 124 and with a second set of pinion gears 128. The carrier member 126 also rotatably supports the second set of pinion gears 128 that intermesh with a sun gear member 132 and a ring gear member 134 and with the first set of pinion gears 127. Those skilled in the art will recognize that the differential gear set 120 may be represented as a five node level diagram, each node of the level diagram representing the following gear elements: sun gear member 122, sun gear member 132, carrier member 126, ring gear member 124 and ring gear member 134. In the claims, the carrier member 126 is referred to as the first gear element, the sun gear member 122 is referred to as the second gear element, the sun gear member 132 is referred to as the third gear element, the ring gear member 134 is referred to as the fourth gear element and the ring gear member 124 is referred to as the fifth gear element.

The input member 116 is continuously connected with the carrier member 126. A first motor/generator 140A is continuously connected to the sun gear member 122. The ring gear members 124 and 134 function as two separate output elements of the differential gear set, partially forming two separate power paths through the transmission 114, as discussed below.

The motor generator 140A includes a stator portion 142A grounded to a stationary member 144, such as the transmission housing. A rotor portion 146A of the motor/generator 140A is continuously connected to the sun gear member 122 via a sleeve shaft 147. The stator 142A may receive electrical power from or provide electrical power to an energy storage device 148 such as a battery. An electronic controller 150 is in signal communication with the battery 148 and with a power inverter 152 that is also in electrical communication with the stator portion 142A. The controller 150 responds to a variety of input signals including vehicle speed, operator demand, the level at which the battery 148 is charged and the power being provided by the engine 112 to regulate the flow of power between the motor/generator 140A and the battery 148 via the inverter 152, which converts between direct current provided or utilized by the battery 148 and alternating current provided or utilized by the stator portion 142A.

A second motor/generator 140B includes a stator portion 142B grounded to the stationary member 144. A rotor portion 146B of the motor/generator 140B is selectively connectable to the sun gear member 132 via engagement of first motor clutch MC1. The rotor portion 146B is also selectively connectable with the ring gear member 134 via engagement of second motor clutch MC2. The battery 148, controller 150 and inverter 152 are operatively connected with the stator portion 142B in the same manner as explained above with respect to the stator portion 142A.

The transmission 114 further includes transfer members 156, 158 and a plurality of intermeshing gears selectively connecting the transfer members 156, 158 with the output member 119 as described below. Ring gear member 124 is continuously connected with transfer member 158. Ring gear member 134 is continuously connected with transfer member 156.

The intermeshing gears are a planetary gear set having a sun gear member 162, a carrier member 165 and a ring gear member 169. The carrier member 165 rotatably supports a set of pinion gears 167 which mesh with both the sun gear member 162 and the ring gear member 169. The sun gear member 162 is continuously connected for common rotation with the ring gear member 134 via the transfer member or shaft 156. The carrier member 165 is continuously connected with the output member 119.

The transmission 114 includes output torque-transmitting mechanisms including an output clutch OC and an output brake OB. The output clutch OC is selectively engagable to connect the ring gear member 124 via the transfer member 158 to both the carrier member 165 and the output member 119. The output brake OB is selectively engagable to ground the ring gear member 169 to the transmission housing 144.

The torque-transmitting mechanisms MC1, MC2, OC and OB are operatively connected to the controller 150 (connected by transfer conductors, not shown for simplicity) that controls engagement thereof to provide multiple operating modes, including an electrically variable input-split (forward mode), two electrically variable compound-split forward modes and three fixed forward ratio modes, as described below.

The transmission 114 can operate in an electrically variable input-split mode for low output speeds by engaging motor clutch MC2. Motor/generator 140B is thereby connected with transfer member 156 and ring gear member 134, which in turn are operatively connected with the output member 119 through the sun gear member 162, pinion gears 127 and carrier member 165. Torque is also provided by the engine 112 through differential gear set 120 to the transfer member 156.

At some point during the electrically variable input-split forward mode, the motor/generator 140B can be connected to the sun gear member 132 by engaging motor clutch MC1 and disconnected from ring gear member 134 by disengagement of motor clutch MC2. With motor/generator 140B connected to the sun gear member 132, the transmission 114 can operate in two different electrically variable compound-split (forward) modes, by engagement of the output clutch OC and the output brake OB, respectively. A first electrically variable compound-split (forward) mode is established by engagement of motor clutch MC2 and output clutch OC and a second electrically variable compound-split (forward) mode is established by engagement of motor clutch MC1 and output brake OB.

In the electrically variable input-split or in the electrically variable compound-split mode, the motor/generator 140A or 140B acts as a motor to add torque to the transmission 114. If braking occurs during these modes, the motor/generator 140A or 140B is controlled as a generator to convert rotational speed of one of the sun gear members 122 or 132 (in compound-split mode), respectively, and to store electrical power in the battery 148 with the motor rotor 146A or 146 B, respectively, absorbing torque as it does so to help slow the output member 119 and brake the vehicle 111. Similarly, the motor/generator 140 A or 140B may be controlled to operate as a generator to recharge the battery 148.

The transmission 114 can operate in three different fixed ratio modes. For example, in the shift from the electrically variable input-split mode in which motor clutch MC2 and output clutch OC are engaged to the electrically variable compound-split mode in which motor clutch MC1 and output clutch OC are engaged (both described above), if both motor clutches MC1 and MC2 are engaged while output clutch OC is engaged, a fixed gear ratio mode will be achieved, as differential gear set 120 will be locked with all components rotating at one speed. Thus, the motor clutches MC1 and MC2 can be operated to take the place of a separate lock-up clutch for the planetary gear set 120.

A second fixed ratio mode is achieved with both motor clutches MC1 and MC2 engaged and output brake OB engaged. A third fixed ratio mode is achieved during compound-split operation with motor clutch MC1 engaged by engaging the output clutch OC as well as the output brake OB, as this will cause the transfer members 156 and 158, and thus the ring gear elements 124 and 134 to rotate at the same speed.

The powertrain 110 provides electric-only operating modes where power is provided only by the motor/generator 140A, 140B such as key-on engine starting and engine-only forward driving. A key-on engine staring in idle operating mode is achieved by engaging both of the motor clutches MC1 and MC2. Electrical energy supplied from the battery 148 to the motor/generator 140A, 140B which act as motors to turn both of the sun gear members 122, 132 in the same direction. The transfer members 156, 158 rotate relatively freely, as none of the output torque-transmitting mechanism OC and OB are engaged, so that the output member 119 does not rotate. The pinion gears 127 and 128 rotate due to sun gear members 122 and 132 and cause the carrier member 126, and thus input member 116 to rotate. This in turn causes rotation of the engine output member (connected to the transmission input member 116), turning the engine 112 over to start the engine 112.

An electric-only forward mode is achieved, for example, by operating motor/generator 140A as a motor to supply torque to ring gear member 134 via sun gear member 122 and pinion gears 127, 128. Ring gear member 134 provides torque to output member 119 via transfer member 156, sun gear member 162, and carrier member 165.

First and second power paths (ring gear member 124 and transfer member 158 being the first power path, ring gear member 134 and transfer member 156 being the second power path) are provided in the transmission 114. The first power path is used whenever the output clutch OC is engaged. The second power path is used whenever output brake OB is engaged.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle with an engine comprising:
   an input member adapted for receiving power from the engine;
   an output member;
   a first and a second motor/generator;
   a differential gear set having a first, a second, a third, a fourth and a fifth gear element operatively interconnected with one another, wherein said input member is connected for common rotation with said first gear element and said first motor/generator is connected for common rotation with said second gear element;
   a plurality of intermeshing gears including at least one gear connected for common rotation with said output member;
   a plurality of selectively engagable torque-transmitting mechanism, including a first motor clutch selectively engagable to connect said second motor/generator for common rotation with said third gear element, a second motor clutch selectively engagable to connect said second motor/generator for common rotation with said fourth gear element, and output torque-transmitting mechanisms;
   first and second transfer members connected for common rotation with said fourth and fifth gear elements, respectively, and separately operatively connectable with said output member via different ones of said intermeshing gears by engagement of different selected ones of said output torque-transmitting mechanisms, thereby partially forming first and second power paths, respectively, between said input member and said output member; and
   wherein the transmission provides multiple operating modes including an electrically variable input-split mode established by engagement of said second motor clutch and one of said output torque-transmitting mechanisms which is engagable to operatively connect said output member to said fourth gear element.

2. The transmission of claim 1, wherein the multiple operating modes include an electrically variable compound-split mode established by engagement of said first motor clutch and said output torque-transmitting mechanisms engaged in said electrically variable input-split operating mode.

3. The transmission of claim 1, wherein the multiple operating modes include a fixed ratio mode established by engagement of both said first motor clutch and said second motor clutch and said output torque-transmitting mechanisms engaged in said electrically, variable input-split operating mode.

4. The transmission of claim 1, further comprising:
   a countershaft operatively connected with said first transfer member by said intermeshing gears;
   wherein said intermeshing gears include a reverse gear set that includes said gear connected for common rotation with said output member, a gear connectable for common rotation with said countershaft, and a reversing gear intermeshing with both said gear connected for common rotation with said output member and said gear connectable for common rotation with said countershaft;
   wherein said output torque-transmitting mechanisms include a reverse output clutch selectively engagable to connect said gear connectable for common rotation with said countershaft with said countershaft; and
   wherein said multiple operating modes include an electrically variable input-split reverse mode established through said reverse gear set by engagement of said first motor clutch and said reverse output clutch.

5. The transmission of claim 4, wherein said intermeshing gearing includes four countershaft gear sets, including said reverse gear set, for transferring torque between said countershaft and one of said first transfer member and said output member; wherein said output torque-transmitting mechanisms include three forward clutches; and wherein said multiple operating modes include two additional electrically variable compound-split forward modes and five fixed speed ratios between said input member and said output member.

6. The transmission of claim 1, wherein said differential gear set is a compound planetary gear set; wherein said first gear element is a planet carrier member, wherein said second gear element is a first sun gear member, wherein said third gear element is a second sun gear member, wherein said fifth gear element is a first ring gear member, wherein said fourth gear element is a second ring gear member; wherein the planet carrier member is equipped with a first set of planet pinion gears which mesh with said first sun gear member and said second sun gear member and a second set of planet pinion gears which mesh with said second sun gear member and said second ring gear member; and wherein said first set of planet pinion gears meshes with the second set of planet pinion gears.

7. The transmission of claim 1, wherein said intermeshing gears are a planetary gear set; wherein said output torque-transmitting mechanisms include a brake selectively engagable to ground a member of said planetary gear set to a stationary member and a clutch selectively engagable to connect said second transfer member for common rotation with said output member; and wherein said multiple operating modes include an additional electrically variable compound-split forward mode and three fixed speed ratios between said input member and said output member.

8. A transmission for a vehicle with an engine comprising:
an input member adapted for receiving power from the engine;
an output member;
a first and a second motor/generator;
a differential gear set having a first, a second, a third, a fourth and a fifth gear element operatively interconnected with one another; wherein said input member is connected for common rotation with said first gear element and said first motor/generator is connected for common rotation with said second gear element;
a plurality of intermeshing gears including at least one gear connected for common rotation with said output member;
a plurality of selectively engagable torque-transmitting mechanisms, including a first motor clutch selectively engagable to connect said second motor/generator for common rotation with said third gear element, a second motor clutch selectively engagable to connect said second motor/generator for common rotation with said fourth gear element, and output torque-transmitting mechanisms;
first and second transfer members connected for common rotation with said fourth and fifth gear elements, respectively, and separately operatively connectable with said output member via different ones of said intermeshing gears by engagement of different selected ones of said output torque-transmitting mechanisms, thereby partially forming first and second power paths, respectively, between said input member and said output member; and
wherein the transmission provides multiple operating modes including an electrically variable input-split mode, at least two electrically variable compound-split modes, and at least three fixed speed ratios between said input member and said output member.

9. A transmission for a vehicle with an engine comprising:
an input member adapted for receiving power from the engine;
an output member;
a first and a second motor/generator;
a differential gear set having a first, a second, a third, a fourth and a fifth gear element operatively interconnected with one another; wherein said input member is connected for common rotation with said first gear element and said first motor/generator is connected for common rotation with said second gear element;
first and second transfer members connected for common rotation with said fourth and fifth gear elements, respectively;
a planetary gear set, operatively connected to said first transfer member and to said output member, including first second and third members;
a plurality of selectively engagable torque-transmitting mechanism, including:
a first torque-transmitting mechanism operatively connected to one of said members of said planetary gear set and selectively engagable to provide a first fixed speed ratio between said first transfer member and said output member;
a second torque-transmitting mechanism operatively connected to another of said members of said planetary gear set and selectively engagable to provide a second fixed speed ratio between said second transfer member and said output member;
a first motor clutch selectively engagable to connect said second motor/generator for common rotation with said third gear element; and
a second motor clutch selectively engagable to connect said second motor/generator for common rotation with said fourth gear element;
wherein engagement of said first motor clutch provides an electrically variable compound-split operating mode through said differential gear set to said first transfer member; and wherein engagement of said second motor clutch provides an electrically variable input-split operating mode through said differential gear set.

10. The transmission of claim 9, wherein said first torque-transmitting mechanism is a brake selectively engagable to ground said third member of said planetary gear set; and
wherein said second torque-transmitting mechanism is an output clutch selectively engagable to connect said second transfer member for common rotation with said second member of said planetary gear set.

11. The transmission of claim 10, wherein engagement of one of said brake and said output clutch causes said first and second transfer members to form first and second power paths, respectively, between said input member and said output member.

* * * * *